Jan. 22, 1957
L. BROOK
2,778,478
FEED MECHANISM FOR WRAPPING MACHINES
Filed Jan. 4, 1954
2 Sheets-Sheet 2
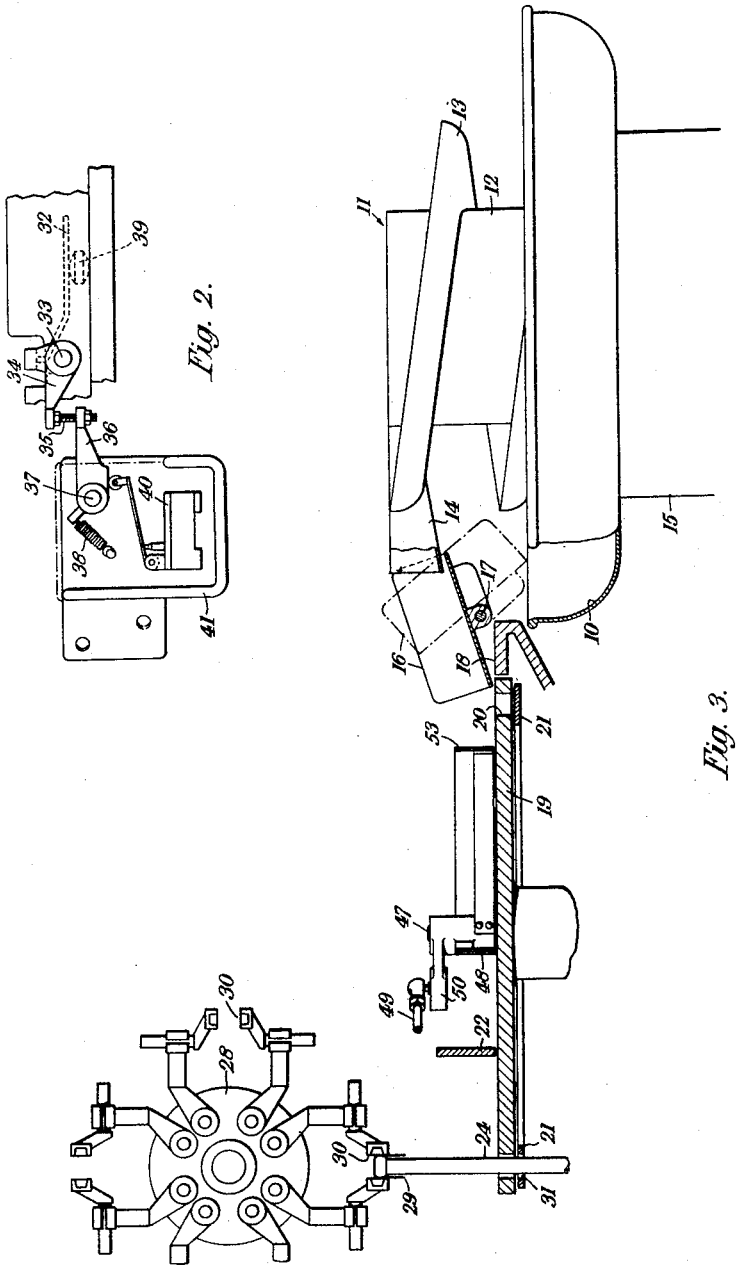
INVENTOR
Leonard Brook
By Watson, Cole, Grindle & Watson
ATTORNEYS United States Patent Office 2,778,478
Patented Jan. 22, 1957

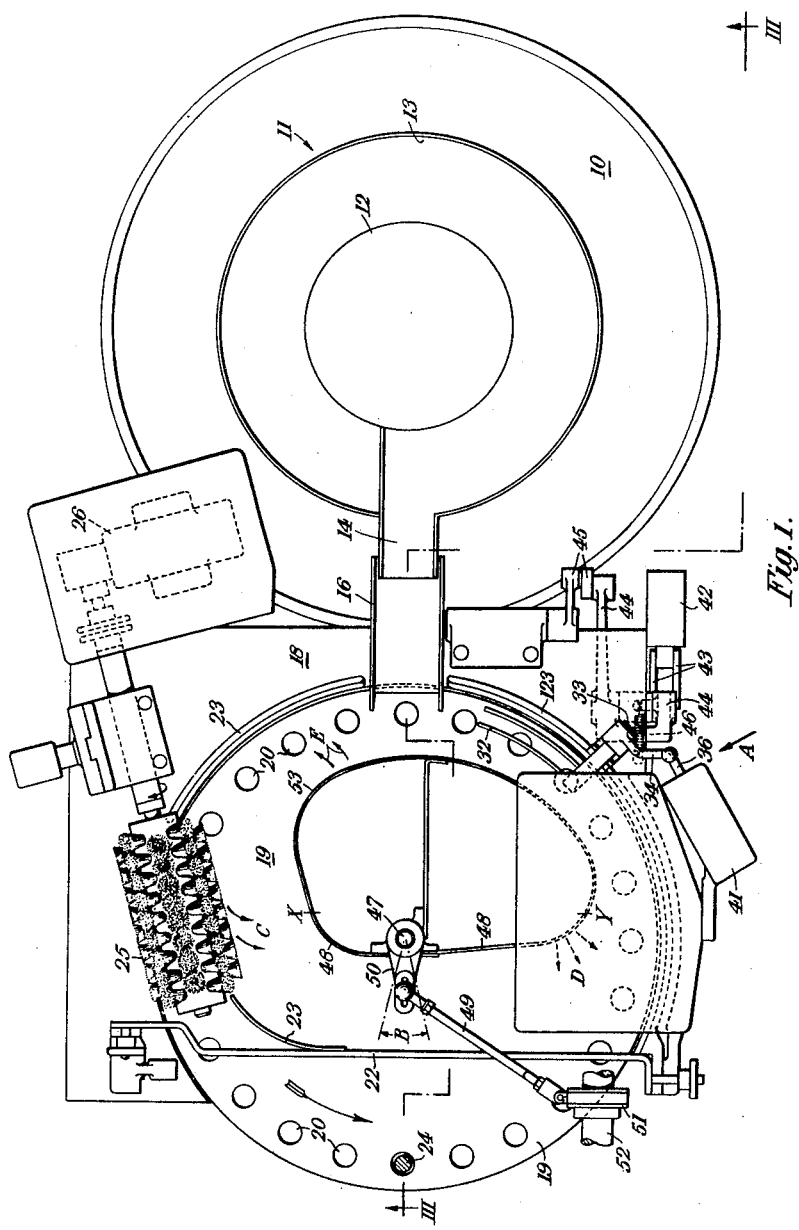

2,778,478
FEED MECHANISM FOR WRAPPING MACHINES

Leonard Brook, Leeds, England, assignor to The Forgrove Machinery Company Limited, Leeds, England, a company of Great Britain Application January 4, 1954, Serial No. 402,089

Claims priority, application Great Britain August 4, 1953

7 Claims. (Cl. 198—107)

This invention relates to wrapping machines of the type comprising an intermittently rotating horizontal feed disc for conveying sweets and like tablets from a loading station to a lifting station, the disc having near its rim a series of circumferentially spaced pockets to accommodate the tablets, means at the loading station for delivering tablets on to the feed disc, a lifting device at the lifting station for lifting the tablets in succession from the pockets in the feed disc, a tray for receiving the tablets delivered on to the feed disc and formed by a portion of the feed disc and fixed walls extending across and around the feed disc, and a rotary brush in contact with the feed disc which prevents tablets not retained in the pockets in the feed disc from passing beyond the tray and on to the lifting station.

In such machines a quantity of tablets accumulates in the tray, and in order to provide adequate space for this accumulation of tablets it is desirable that the tray should extend over a substantial area of the feed disc. The fixed wall of the tray opposite the loading station and the rotary brush act to deflect tablets away from the periphery of the feed disc and towards its centre, and this effect is particularly marked when said fixed wall is disposed beyond the centre of the disc, i. e. on the side of the disc axis remote from the loading station. It is accordingly necessary to provide a device for scattering these tablets and throwing them back towards the rim of the feed disc, where they will have an opportunity of falling into the pockets in the feed disc.

According to the invention I provide for this purpose, in a machine of the above type, an arm mounted within the tray, for pivotal movement across the feed disc on a vertical pivot located at or near the centre of the disc, and mechanism for oscillating the arm about its pivot. Such an arrangement, particularly when the arm performs one to-and-fro oscillation per machine cycle has been found very effective in breaking up accumulations of sweets such as occur under sticky conditions.

One embodiment of the invention will now be described in detail, by way of example, with reference to the accompanying drawings, in which:

Fig. 1 is a plan view of the feed disc and associated parts,

Fig. 2 is a view, on a larger scale, looking in the direction of the arrow A in Fig. 1, and Fig. 3 is an elevation, partly in section, of the apparatus shown in Fig. 1 with certain parts removed.

Like reference numerals designate like parts throughout the figures.

In the arrangement shown in Figs. 1–3, the tablets are lifted from a feed bowl 10 by a spiral elevator 11. This comprises a vertical tube 12, extending upwardly from the feed bowl 10 and surrounded by a spiral ramp 13, which terminates at its upper end in a discharge platform 14. The elevator 11 is given a vibratory pitching movement, imparted thereto by an electromagnetic vibrator (not shown) disposed in a casing 15 beneath the elevator, whereby tablets placed in the feed bowl 10 are caused to travel in procession up the ramp 11 and so on to the platform 14. The tablets fall from the platform 14, the undersurface of which is sloped as shown in Fig. 3, on to a chute 16, pivoted at 17 to a plate 18 adjoining the feed disc 19. The chute 16 normally occupies the position shown in full lines in Fig. 3 and the tablets accordingly tumble down it on to the feed disc 19.

The feed disc has circumferentially spaced pockets 20 in it to receive the tablets, the pockets travelling, as the feed disc is intermittently rotated in a counterclockwise direction, over a fixed annular plate 21, which supports the bases of the tablets. The tablets on the feed disc are confined by a tray constituted by an end wall 22 extending across the feed disc between a lifting plunger 24 and the centre of the feed disc and by side walls 23, 123 extending around the periphery of the feed disc between the end wall 22 and the elevator 11. The flow of tablets to the lifting station, at which the lifting plunger 24 is situated, is controlled by a rotary brush 25, disposed in a gap in the side wall 23. This is driven by an electric motor 26 and rotates in a direction opposite to the direction of travel of the tablets. The brush 25 ensures that but one tablet can become lodged in any one pocket 20 of the feed disc and ensures that only the tablets contained in the pockets can pass on to the lifting plunger.

The lifting plunger 24 operates intermittently, while the feed disc 19 is stationary, to lift the tablets in succession from the pockets of the feed disc into the pockets 30 of a twist wrapping head 28 each tablet carrying with it a wrapper 29 which, in conventional fashion, is draped in U-formation about the tablet as it is lifted into the pocket. The annular plate 21 is formed with a hole 31 to permit of the passage through it of the lifting plunger 24.

The elevator 11 normally feeds tablets to the feed disc 19 at a rate greater than the rate of removal of tablets from the feed disc by the lifting plunger 24. The tablets consequently tend to accumulate on the feed disc. A trip arm 32, pivoted at 33, carries an extension 34 (Fig. 2), coacting with a screw 35 on an arm 36, pivoted at 37 and attached to a spring 38. When the tablets have accumulated sufficiently on the feed disc to lift the trip arm 32 above a predetermined level, the arm 36 is rocked clockwise to actuate a microswitch 40 contained in a casing 41. Actuation of the switch 40 de-energises a solenoid 42, the armature of which is coupled by a link 43, a bell crank 44 and links 45 to the chute 16, thereby allowing a spring 46 to rock the bell crank 44, so tipping the chute into a position, shown in chain-dotted lines in Fig. 3, in which it diverts back to the feed bowl 10 the tablets delivered to it from the discharge platform 14. As soon as the accumulation of tablets on the feed disc has cleared sufficiently, the trip arm 32 drops again, whereupon the spring 38 lifts the arm 36 clear of the switch, thereby re-energising the solenoid 42 which thereupon returns the chute 16 to the position shown in full lines in Fig. 3.

Mounted on a pivot 47 coaxial with or somewhat offset from the axis of the feed disc 19 is a thin steel blade 48, presented edgewise to the feed disc. The blade, which may extend only for the distance XY, extends more or less parallel to the end wall 22, on the side of the pivot nearer the end wall, with its tip Y curved towards the loading station at which the elevator 11 is situated. The blade 48 is oscillated through a small angle B about its pivot 47, preferably once per machine cycle, by a link 49, connected to an arm 50 attached to the blade and oscillated by an eccentric 51 on a shaft 52. The blade 48 serves to deflect outwardly towards the rim of the feed disc tablets which have been diverted towards the centre of the feed disc by the end wall and by the brush 25.

If desired the blade may be provided, as shown, on the side of the pivot 47 nearer the loading station, with an extension 53 for also scattering outwardly tablets in the portion of the tray between the centre of the feed disc and the loading station. In this case, the blade is constituted by a continuous steel strip 48, 53 presented edgewise to the feed disc and of approximately oval shape as seen in plan.

The tablets which fail to pass beneath the brush 25 tend to travel towards the centre of the feed disc as indicated by the arrows C (Fig. 1). The portion 48 scatters the tablets outwards as indicated by the arrows D and the portion 53 scatters the tablets outwards as indicated by the arrows E.

What I claim as my invention and desire to secure by Letters Patent is:

1. In a wrapping machine, the combination of an intermittently rotating horizontal feed disc for conveying tablets from a loading station to a lifting station, said disc having near its rim a series of circumferentially spaced pockets to accommodate the tablets, means at the loading station for delivering tablets on to the feed disc, a lifting device at the lifting station for lifting the tablets in succession from the pockets of said feed disc, a tray for confining the tablet delivered onto the feed disc, said tray being formed by a portion of the feed disc and fixed walls extending across and around the feed disc, a rotary brush in contact with the feed disc, which permits only of passage of tablets contained in said pockets from the tray to the lifting station, a scattering member mounted within the tray for pivotal movement across the feed disc about a vertical axis near the centre of the feed disc, and mechanism for oscillating said scattering member about its pivot to scatter outwardly tablets accumulated near the centre of the feed disc.

2. In a wrapping machine, the combination of an intermittently rotating horizontal feed disc for conveying tablets from a loading station to a lifting station, said disc having near its rim a series of circumferentially spaced pockets to accommodate the tablets, means at the loading station for delivering tablets on to the feed disc, a lifting device at the lifting station for lifting the tablets in succession from the pockets of said feed disc, a tray for confining the tablets delivered onto the feed disc, said tray being formed by a portion of the feed disc and fixed walls extending across and around the feed disc, a rotary brush in contact with the feed disc, which permits only of passage of tablets contained in said pockets from the tray to the lifting station, a scattering member mounted within the tray for pivotal movement across the feed disc about a vertical axis near the centre of the feed disc, and mechanism for oscillating said scattering member about its pivot to scatter outwardly tablets accumulated near the centre of the feed disc, said scattering member performing one to-and-fro oscillation per machine cycle.

3. In a wrapping machine, the combination of an intermittently rotating horizontal feed disc for conveying tablets from a loading station to a lifting station, said disc having near its rim a series of circumferentially spaced pockets to accommodate the tablets, means at the loading station for delivering tablets on to the feed disc, a lifting device at the lifting station for lifting the tablets in succession from the pockets of said feed disc, a tray for confining the tablets delivered onto the feed disc, said tray being formed by a portion of the feed disc and by a fixed end wall extending across the feed disc between the lifting station and the centre of the feed disc and side walls extending around the periphery of the feed disc between the end wall and the loading station, a rotary brush, disposed in a gap in one of said side walls, in contact with the feed disc, which permits only of passage of tablets contained in said pockets from the tray to the lifting station, a scattering member mounted within the tray for pivotal movement across the feed disc about a vertical axis near the centre of the feed disc, and mechanism for oscillating said scattering member about its pivot to scatter outwardly tablets accumulated near the centre of the feed disc.

4. In a wrapping machine, a combination as claimed in claim 3, in which the scattering member is constituted by a thin blade presented edgewise to the feed disc and extending from its pivot more or less parallel to the end wall and having its tip curved towards the loading station.

5. In a wrapping machine, a combination as claimed in claim 3, in which the scattering member is constituted by a thin continuous blade presented edgewise to the feed disc and of approximately oval section as seen in plan, one long side of the blade being disposed adjacent to its pivot and extending approximately parallel to the end wall and the other long side of the blade being spaced from the pivot towards the loading station.

6. In a wrapping machine, the combination of an intermittently rotating horizontal feed disc for conveying tablets from a loading station to a lifting station, said disc having near its rim a series of circumferentially spaced pockets to accommodate the tablets, means at the lifting station for lifting tablets in succession from the pockets in the feed disc, an elevator at the loading station for feeding a procession of tablets on to the feed disc at a rate exceeding the rate of removal of tablets therefrom at the lifting station, a trip member adapted to rest on the tablets on the feed disc, and means operative in response to lifting of the trip arm, by accumulation of tablets beneath it, above a predetermined level for diverting the flow of tablets from the elevator away from the feed disc until the trip member has fallen again to said predetermined level.

7. In a wrapping machine, the combination of an intermittently rotating horizontal feed disc for conveying tablets from a loading station to a lifting station, said disc having near its rim a series of circumferentially spaced pockets to accommodate the tablets, means at the lifting station for lifting tablets in succession from the pockets in the feed disc, an elevator at the loading station for feeding a procession of tablets on to the feed disc at a rate exceeding the rate of removal of tablets therefrom at the lifting station, said elevator comprising a feed bowl, a discharge platform and a spiral platform leading upwardly from the feed bowl to the discharge platform and adapted, when vibrated, to cause the tablets to travel in procession from the feed bowl to the discharge platform, a hinged chute for delivering tablets from the discharge platform to the feed disc, a trip member adapted to rest on the tablets in the feed disc, and means operative in response to lifting of said trip arm above a predetermined level for tipping said chute to position to return tablets from the discharge platform to the feed bowl.

References Cited in the file of this patent
UNITED STATES PATENTS

| | | |
|---|---|---|
| 990,593 | Ringland et al. | Apr. 25, 1911 |
| 1,989,924 | Hill | Feb. 5, 1935 |
| 2,266,906 | Rapp | Dec. 23, 1941 |
| 2,661,833 | Spurlin | Dec. 8, 1953 |